United States Patent [19]

Jones

[11] Patent Number: 4,901,412
[45] Date of Patent: Feb. 20, 1990

[54] APPARATUS FOR MOVING PALLETS IN AUTOMATED MACHINE TOOL ASSEMBLIES

[75] Inventor: Joel W. Jones, Windsor, Canada

[73] Assignee: Tri-Way Machine Ltd., Windsor, Ontario, Canada

[21] Appl. No.: 245,919

[22] Filed: Sep. 19, 1988

[30] Foreign Application Priority Data

Jul. 12, 1988 [CA] Canada ................................. 571,797

[51] Int. Cl.⁴ ........................ B23Q 7/00; B65G 47/00
[52] U.S. Cl. ...................................... 29/33 P; 29/563; 198/465.1
[58] Field of Search .......................... 29/33 P, 563, 564; 198/465.1, 465.2

[56] References Cited

U.S. PATENT DOCUMENTS

| | | | |
|---|---|---|---|
| 2,392,169 | 1/1946 | Mansfield | 29/33 P |
| 3,155,217 | 11/1964 | Cross | 198/345 |
| 3,213,996 | 10/1965 | Tech | 198/345 |
| 4,360,097 | 11/1982 | Brems | 198/345 |
| 4,394,897 | 7/1983 | Brems | 198/345 |

Primary Examiner—Daniel Howell
Attorney, Agent, or Firm—Shoemaker and Mattare, Ltd.

[57] ABSTRACT

An automated machine tool assembly has a plurality of work stations between which pallets with workpieces mounted on them can be moved for the performing of various machine tool operations on the workpieces. The pallets slide on slide rails, and during their movement an upward force is exerted on the pallets which is sufficient to reduce the frictional drag between the pallets and the slide rails, but is insufficient to lift the pallets off the slide rails.

5 Claims, 2 Drawing Sheets

APPARATUS FOR MOVING PALLETS IN AUTOMATED MACHINE TOOL ASSEMBLIES

This invention relates generally to machine tool assemblies, and has to do particularly with an improved method and apparatus for moving pallets in automated machine tool assemblies.

BACKGROUND OF THIS INVENTION

It is now common to use automated machine tool equipment to make parts for use in the automotive and other industries. Typically, the parts are secured to pallets, which are heavy metal structures, and the pallets are moved from station to station so that the workpiece can receive the various machining operations. Most automated machine tool equipment now in use utilizes transfer bars which reciprocate in a horizontal direction for transferring pallets (and the mounted workpieces) from one station to the next.

Conventionally, there are two modes for transferring these pallets:

(a) a lift and carry mode, in which a plurality of pallets are picked up at the work station, lifted a predetermined amount off the rails, advanced by the distance between stations, and set back down on the rails;

(b) a slide mode in which a plurality of pallets is trapped at both ends at the various work stations, and then advanced one station at the time by sliding them on the rails.

The advantage of (a) lies in the fact that by lifting and lowering the pallets, no rail wear occurs, thus maintaining the machining accuracy. The disadvantage of (a) lies in the fact that chips or swarf which are part of the machining process may get trapped under the pallets, resulting in inaccurate location at the work station, even to the extent of causing malfunction at the work stations.

The advantage of (b) lies in the fact that by sliding the pallet, chips and swarf cannot enter between the pallet and the rails, but instead are pushed off the rails into so called dirt grooves during transfer. The disadvantage of (b) obviously is due to this very sliding motion which because of the abrasiveness of chips and swarf causes rail wear and loss of accuracy at the work stations.

PRIOR ART

The following patents are of general interest in this area:

U.S. Pat. No. 3,155,217, issued Nov. 3, 1964 to R. E. Cross

U.S. Pat. No. 4,148,400, issued Apri. 10, 1979 to R. E. Cross

U.S. Pat. No. 3,213,996, issued Oct. 26, 1965 to K. O. Tech

U.S. Pat. No. 4,360,097, issued Nov. 23, 1982 to J. H. Brems

U.S. Pat. No. 4,354,796, issued Oct. 19, 1982 to R. A. Bergman

U S. Pat. No. 4,394,897, issued July 26, 1983 to J. H. Brems

U.S. Pat. No. 4,479,576, issued Oct. 30, 1984 to G. Di Rossa

U.S. Pat. No. 3,237,759, issued Mar. 1, 1966 to F. A. Solski

U.S. Pat. No. 4,669,607, issued June 7, 1987 to A. C. Mason

U.S. Pat. No. 4,593,810, issued June 10, 1986 to K. Cook.

GENERAL DESCRIPTION OF THIS INVENTION

In view of the previous discussion, it has been realized that the ideal way of transferring pallets is to keep the pallets in contact with the rails, but to reduce friction between the rails and the pallets to a minimum by reducing the actual drag on the rails due to pallet assembly weight.

In the present invention, a series of spring-loaded plungers is used to relieve some of the weight of the pallets and the parts mounted thereon, during movement along the rails.

More particularly, this invention provides, in an automated machine tool assembly having a plurality of work stations between which pallets with workpieces mounted thereon can be moved for the performing of various machine tool operations on the workpieces, the assembly including slide rails along which the pallets can move between work stations and upon which the pallets can be locked in place at the respective work stations, a method of maintaining the accuracy of pallet registry at the work stations, comprising sliding the pallets along the rails while simultaneously exerting an upward force on the pallets which is sufficient to reduce the frictional drag between the pallets and the slide rails, but which is insufficient to lift the pallets off the slide rails.

Additionally, this invention provides, in an automated machine tool assembly having a plurality of work stations between which a pallet with a workpiece mounted thereon can be moved for the performing of various machine tool operations on the workpiece, the assembly including slide rails along which the pallet can move between work stations and upon which the pallet can be locked in place at the various work stations, a method of operation comprising the steps:

(a) locking the pallet in place on the slide rails at a first work station, (b) performing a machine tool operation on the workpiece, (c) unlocking the pallet, (d) sliding the pallet along the slide rails to the next sequential work station while simultaneously applying an upward force against the pallet which is sufficient to reduce the frictional drag between the pallet and the slide rails but is insufficient to lift the pallet off the slide rails, (e) locking the pallet in place at the next sequential work station, (f) repeating steps (b) to (e) repeatedly until all desired operations have been performed on the workpiece.

Further, this invention provides, in an automated machine tool assembly having a plurality of work stations between which a pallet with a workpiece mounted thereon can be moved for the performing of various machine tool operations on the workpiece, the assembly including slide rails along which the pallet can move between work stations and upon which the pallet can be locked in place at the various work stations, a method of operation comprising the steps:

(a) locking the pallet in place on the slide rails at a first work station, (b) performing a machine tool operation on the workpiece, (c) unlocking the pallet,
(d) sliding the pallet along the slide rails to the next sequential work station while simultaneously applying an upward force against the pallet which is sufficient to reduce the frictional drag between the pallet and the slide rails but is insufficient to lift the pallet off the slide rails,
(e) locking the pallet in place at the next sequential work station, and
(f) performing another machine tool operation on the workpiece.

Finally, this invention provides an automated machine tool assembly comprising:
a plurality of work stations,
slide rails connecting the work stations in a serial manner,
at least one pallet on which a workpiece can be mounted so that various machine tool operations can be performed on the workpiece at the different work stations, the pallet being slidable on top of the slide rails,
transfer bar means adjacent and parallel to the slide rails, the transfer bar means having engagement means for engaging said at least one pallet and being slidable longitudinally of the slide rails to move said at least one pallet between work stations,
means for moving the transfer bar means longitudinally of the slide rails,
and lift means for applying an upward force against said at least one pallet which is sufficient to reduce frictional drag between the pallet and the slide rails but is insufficient to lift the pallet off the slide rails.

GENERAL DESCRIPTION OF THE DRAWINGS

One embodiment of this invention is illustrated in the accompanying drawings, in which like numerals denote like parts throughout the several view, and in which.

DETAILED DESCRIPTION OF THE DRAWINGS

Figure 1:
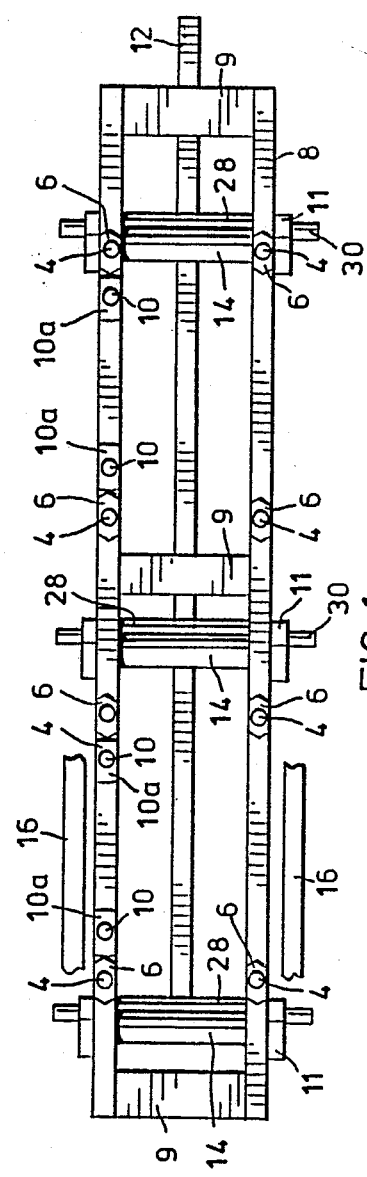
FIG. 1 is a plan view of automated machine tool apparatus constructed in accordance with this invention.
Figure 2:
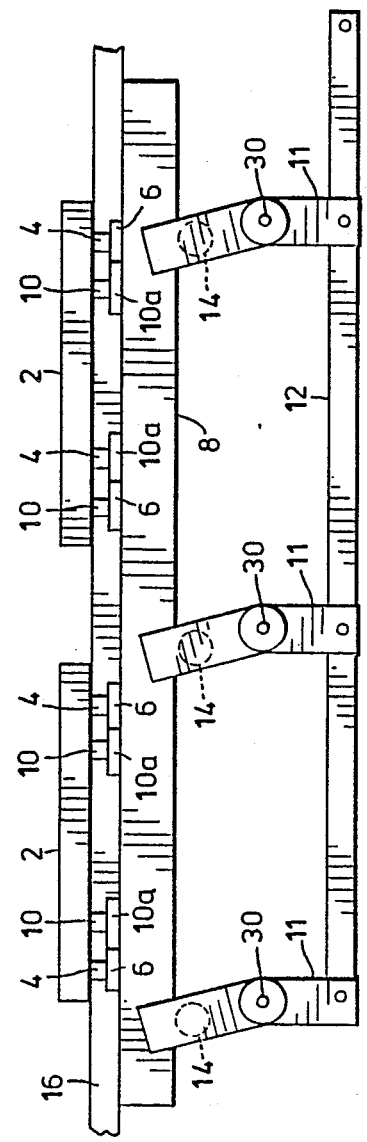
FIG. 2 is an elevational view of the apparatus of FIG. 1.

With reference to FIGS. 1 and 2, a plurality of pallets 2 are adapted to move on fixed rails 16 in a slidable fashion. The fixed rails 16 are firmly supported by a frame structure which is not shown. Inwardly adjacent and slightly below each of the slide rails 16 is a transfer bar 8. The two transfer bars 8 are connected together by bridging pieces 9, so that they move together as a unit.

One of the rails 8 (the uppermost rail in FIG. 1) has mounted to it a plurality of locating pins 10, the locating pins 10 being provided in pairs for each pallet position. Each locating pin 10 is secured to a mounting member 10a which is fixed on the rail 8, and is adapted to be received in a vertical bore in the pallet 2 in known fashion.

Each of the rails 8 has affixed thereto in pairs for each pallet position a number of plungers 4 which are mounted for vertical reciprocation with respect to the respective transfer bar 8. Looking at FIG. 3 the transfer bar 8 has, at each plunger location, a threaded vertical bore 20 which firmly receives a threaded bushing 6, defining an internal smooth bore for slidably receiving the plunger 4. As can be seen, the plunger 4 has an enlarged head 22 at the bottom, against which a coil compression spring 18 pushes upwardly. The coil compression spring 18 is trapped between the head 22 and the bottom 24 of the bore 20. An oil drain outlet 26 is provided in communication with the bore 20.

Figure 3:
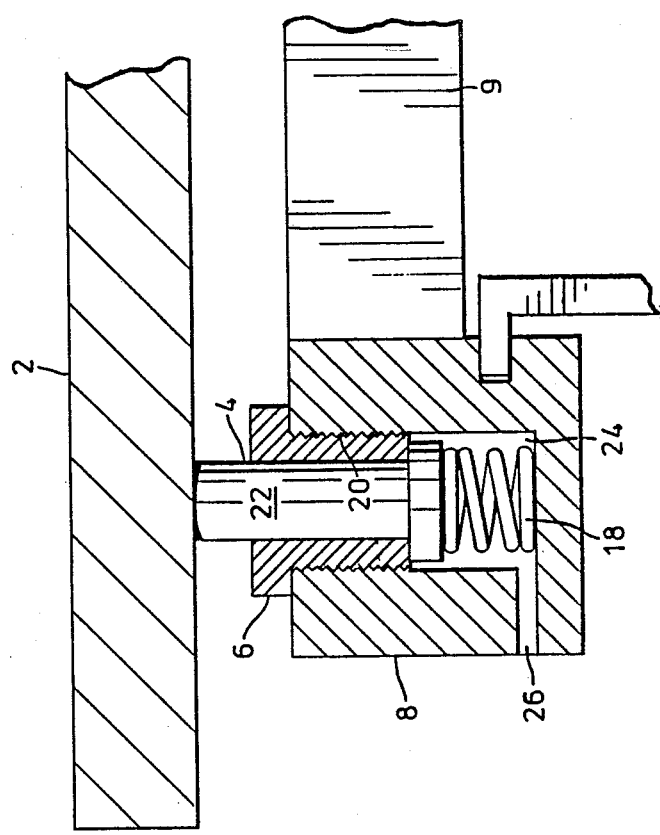
FIG. 3 is a vertical sectional view through one component of the apparatus shown in FIGS. 1 and 2.

As is clearly seen in FIG. 3, the plunger 4 engages a bottom surface of the pallet 2.

In order to exert upward force on the pallets 2, the transfer bars 8 must be lifted while they are moving longitudinally to shift the position of the pallets 2. The lift must be sufficient to reduce frictional drag between the pallet 2 and the slide rails 16, but insufficient to lift the pallet entirely off the slide rails 16.

The vertical lift of the transfer bars 8 is accomplished by means of a plurality of arms 11 and a drag link 12 which is connected to the arms 11 by cross members 28. The arms 11 are slightly crooked, and are provided in pairs just outboard of the transfer bars 8. The pairs of arms 11 are each pivoted about a common horizontal axis 30 which runs transverse to the direction of the slide rails 16. Between each pair of arms 11 is mounted a freely rotating roller 14 on which the transfer bars 8 rest.

It can be clearly understood from FIG. 2 that leftward motion of the drag link 12 will cause the upper angulated portions of the arms 11 to swivel in the clockwise direction, thus slightly raising the vertical position of the rollers 14 and the transfer bars 8, thus exerting upward pressure on the pallets 2.

In operation, a given pallet 2 would be first locked in place against the slide rails 16 by conventional locking means (not shown), whereupon a machine tool operation would be carried out on the workpiece mounted on the pallet. Then, the pallet would be unlocked. Next, the pallet would be slid along the slide rails 16 to the next sequential work station while simultaneously applying an upward force against the pallet which is sufficient to reduce the frictional drag between the pallet and the slide rails but is insufficient to lift the pallet off the slide rails. This is done by simultaneously moving the drag link 12 leftwardly in order to raise the transfer bars 8, and at the same time causing the transfer bars 8 to move longitudinally and thus carry the pallet to the next position. The transfer bars are actually moved longitudinally by appropriate means not forming a part of this invention. When the pallet has reached the next position, it is again locked in place using conventional locking equipment, and the next machine tool operation is performed on the workpiece.

In normal operation, a number of pallets are carried along simultaneously to sequential work positions.

While one embodiment of this invention has been illustrated in the accompanying drawings and described hereinabove, it will be evident to those skilled in the art that changes and modifications may be made thereto without departing from the essence of this invention, as set forth in the appended claims.

The embodiments of the invention in which an exclusive property or privilege is claimed are defined as follows:

1. An automated machine tool assembly comprising:
    a plurality of work stations,
    slide rails connecting the work stations in a serial manner,
    at least one pallet on which a workpiece can be mounted so that various machine tool operations can be performed on the workpiece at the different work stations, the pallet being slidable on top of the slide rails, transfer bar means adjacent and parallel to the slide rails, the transfer bar means having engagement means for engaging said at least one pallet and being slidable longitudinally of the slide rails to move said at least one pallet between work stations, means for moving the transfer bar means longitudinally of the slide rails, and lift means for applying an upward force against said at least one pallet which is sufficient to reduce frictional drag between the pallet and the slide rails but is insufficient to lift the pallet off the slide rails.

2. The invention claimed in claim 1, in which said lift means comprises:

resilient means between the transfer bar means and the pallet by which upward motion of the transfer bar means causes upward force to be exerted on the pallet, and means for raising the transfer bar means when the transfer bar means moves longitudinally of the slide rails to move the pallet between work stations.

3. The invention claimed in claim 2, in which the resilient means comprises a plurality of plungers mounted for vertical reciprocation with respect to the transfer bar means, and for each plunger a coil compression spring biasing the plunger upwardly, the plungers being adapted to engage a bottom surface of said at least one pallet.

4. The invention claimed in claim 2, in which said means for raising the transfer bar means comprises a plurality of arms pivoted for rocking motion about horizontal axes transverse to the slide rails, the arms supporting a plurality of rollers on which the transfer bar means rests, the arms being connected to move in tandem thus raising and lowering their rollers simultaneously, and drag link means for causing the arms to rock about their axes.

5. The invention claimed in claim 3, in which said means for raising the transfer bar means comprises a plurality of arms pivoted for rocking motion about horizontal axes transverse to the slide rails, the arms supporting a plurality of rollers on which the transfer bar means rests, the arms being connected to move in tandem thus raising and lowering their rollers simultaneously, and drag link means for causing the arms to rock about their axes.

* * * * *